(12) United States Patent
Van Schaftingen et al.

(10) Patent No.: US 7,858,016 B2
(45) Date of Patent: Dec. 28, 2010

(54) LAYER MADE OF BASE PLASTIC COMPRISING BARRIER PLASTIC NODULES

(75) Inventors: Jules-Joseph Van Schaftingen, Wavre (BE); Serge Dupont, Vilvoorde (BE); Barbara Mabed, Brussels (BE)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 1022 days.

(21) Appl. No.: 10/590,273

(22) PCT Filed: Feb. 21, 2005

(86) PCT No.: PCT/EP2005/050730
§ 371 (c)(1),
(2), (4) Date: Jan. 11, 2007

(87) PCT Pub. No.: WO2005/082615
PCT Pub. Date: Sep. 9, 2005

(65) Prior Publication Data
US 2007/0184224 A1  Aug. 9, 2007

(30) Foreign Application Priority Data
Feb. 26, 2004 (FR) .................................. 04 01946

(51) Int. Cl.
*B29C 45/14* (2006.01)
*B29C 47/00* (2006.01)
*B32B 27/00* (2006.01)

(52) U.S. Cl. ............ 264/515; 264/173.14; 264/173.19; 264/176.1

(58) Field of Classification Search ................ 524/1, 524/8, 459, 500, 503; 428/34.1, 34.4, 34.6, 428/34.7, 35.2, 35.4, 35.5, 35.7, 36.4, 36.6, 428/36.7, 36.9, 36.91, 36.92; 264/514, 173.12, 264/173.16, 515, 173.14, 173.19, 176.1
See application file for complete search history.

(56) References Cited

U.S. PATENT DOCUMENTS

| 5,384,172 A * | 1/1995 | Takado et al. .............. 428/35.7 |
| 5,618,599 A | 4/1997 | Nulman et al. |
| 6,399,170 B1 * | 6/2002 | Hock et al. ................ 428/36.6 |
| 2003/0118766 A1 | 6/2003 | Hory et al. |

FOREIGN PATENT DOCUMENTS

| EP | 0 742 096 | 11/1996 |
| EP | 1 241 039 | 9/2002 |
| FR | 2 765 828 | 1/1999 |
| FR | 2 776 228 | 9/1999 |
| JP | 11 342569 | 12/1999 |
| JP | 2000 313749 | 11/2000 |
| JP | 2002 241546 | 8/2002 |
| JP | 2004 018075 | 1/2004 |
| WO | 03 024692 | 3/2003 |
| WO | 2004 081094 | 9/2004 |

OTHER PUBLICATIONS

A. Prasad, et al.,"Compatibilizing Effect of a Functionally Modified Graft Copolymer in Heterogeneous High Density Polyethylene/ Ethylene-Vinyl Alcohol (HDPE/EVOH) Blends.", American Chemical Society, vol. 75, pp. 281-282, 1996.

* cited by examiner

*Primary Examiner*—Rena L Dye
*Assistant Examiner*—Walter B Aughenbaugh
(74) *Attorney, Agent, or Firm*—Oblon, Spivak, McClelland, Maier & Neustadt, L.L.P.

(57) ABSTRACT

Layer made of base plastic comprising, in the dispersed form, nodules with a diameter of less than or equal to one micron comprising barrier plastic incompatible with the base plastic; multilayer structure comprising at least one such layer and process for the manufacture of such layers/structures.

8 Claims, No Drawings

LAYER MADE OF BASE PLASTIC COMPRISING BARRIER PLASTIC NODULES

This application is a 371 of PCT/EP05/50730 filed Feb. 21, 2005.

The present invention relates to a layer made of base plastic comprising barrier plastic nodules and to multilayer structures comprising at least one such layer. It relates more particularly to the recycling and the reuse of the constituents of multilayer hollow bodies comprising at least one barrier plastic layer and one base plastic layer.

Such multilayer structures are commonly used in highly varied industries, for example in the manufacture of packaging materials or of fuel tanks. An example of a multilayer fuel tank comprises 5 layers:

PE/adhesive/E-VOH/adhesive/PE, where PE denotes high density polyethylene and EVOH denotes an ethylene-vinyl alcohol copolymer, it being possible for the adhesive to be in particular a polyethylene grafted with maleic anhydride (PE-g-MA).

During the manufacture of plastic-based articles, in particular by extrusion-blow moulding, a high amount (often more than 40%) of production waste (scraps) is inevitably produced, the recovery of which is advantageous economically. It is a fortiori the same in the case of the scrapping of whole articles which have failed specification or of waste whole articles. In the case of multilayer structures, the presence of several different plastics poses problems during their recycling: if the situation is limited to grinding them into particles and to reusing them in the manufacture of a new article, there is a risk of the latter exhibiting mediocre mechanical performances; consequently, it is sometimes necessary, depending upon the geometry of the tank, to strictly limit the amounts of material thus recycled. It is therefore desirable to have available a simple and effective method which makes it possible to separate constituents of multilayer structures for the purpose of being able to reuse them in a manner comparable to virgin constituents without affecting the performances of the new articles manufactured from the constituents thus recovered.

Thus, Patent Application FR 2 765 828 on behalf of the Applicant Company provides a process for the recycling of fuel tanks comprising at least one layer of a base plastic and one layer of a barrier plastic separated by a layer of adhesive plastic, in which the said tanks are reduced to fragments and these fragments are subjected to an electrostatic separation under given conditions.

However, to date, the level of reuse of these recycled plastics, and of recycled plastics in general, is limited as they are in fact only used in the intermediate layer of articles, in particular for reasons of mechanical strength of the inner layer and, as regards the outer layer, for aesthetic reasons and in order to be able to ensure that certain fittings are welded in a dependable way to the tank. Such a use of recycled plastics in an intermediate layer is, for example, recommended in Patent Application FR 2 765 828, also on behalf of the Applicant Company.

In point of fact, being able to increase the level of use of waste (as a result of being able to use it both in the intermediate layers and in the external layers) often makes it possible to achieve substantial savings, in particular in the case of large-scale production and/or production involving expensive materials.

The present invention is based on the surprising observation that, provided that the barrier plastic is distributed in the base plastic in the form of small nodules (with a diameter of less than or equal to one micron), the use of fragments of multilayer structures in monolayer articles or in the external (inner and/or outer) layers of a multilayer structure does not affect its properties.

Consequently, the present invention relates to a layer made of base plastic comprising, in the dispersed form, nodules with a diameter of less than or equal to one micron comprising barrier plastic incompatible with the base plastic.

The term "plastic" is understood to denote any polymer or blend of polymers. Thermoplastics are highly suitable in the context of the invention. The term "thermoplastic" denotes any thermoplastic polymer, including thermoplastic elastomers, and their blends. The term "polymer" denotes both homopolymers and copolymers (binary or tertiary in particular). Examples of such copolymers are, without implied limitation: copolymers with a random distribution, sequential copolymers, block copolymers and grafted copolymers.

Any type of thermoplastic polymer or copolymer with a melting point lower than the decomposition temperature is suitable. Synthetic thermoplastics which exhibit a melting range spread over at least 10 degrees Celsius are particularly highly suitable. Those which exhibit a polydispersion in their molecular mass are examples of such thermoplastics.

In particular, use may be made of polyolefins, poly(vinyl halide)s, thermoplastic polyesters, polyketones, polyamides and their copolymers. A blend of polymers or copolymers can also be used, as well as a blend of polymers with inorganic, organic and/or natural fillers, such as, for example, but without implied limitation: carbon, salts and other inorganic derivatives, natural fibres, glass fibres and polymer fibres. Good results have also been obtained with nanocomposites (or polymers with fillers of nanometric size).

To this end, it should be noted that the terms "made of plastic" used above are understood to mean composed to more than 80% of the total weight of the said plastic and in particular to more than 90%.

The base plastic is chosen according to the mechanical and/or chemical properties which the structure has to exhibit. To this end, use is generally made of conventional polymers, such as polyolefins or halogenated polymers. Good results have been obtained when the base plastic is essentially composed of one or more polyolefins chosen from ethylene or propylene homopolymers and copolymers.

Excellent results have been obtained with high density polyethylene (HDPE), this being in particular the case when the hollow body is a fuel tank.

The term "barrier plastic" (constituting in all or in part the dispersed nodules, it being understood that the barrier plastic can be a blend of barrier plastics and/or can comprise conventional additives, such as pigments, plasticizers, antioxidants, and the like) is understood to denote any plastic incompatible with the base plastic and capable of forming a layer exhibiting a low permeability with regard to specific fluids, such as, for example, hydrocarbon-based fuels. Advantageous crystalline polymers exhibiting such properties are in particular polyamides, fluoropolymers and vinyl alcohol polymers [homopolymers (PVOH) and ethylene-vinyl alcohol copolymers (EVOH)]. Very good results are obtained when the barrier plastic is essentially composed of one or more polymers chosen from polyamides and ethylene-vinyl alcohol copolymers and very particularly of the latter.

An important parameter in the context of the present invention is the morphology of the nodules comprising the barrier plastic. According to the invention, these nodules or agglomerates, of substantially spherical shape, have a diameter (to be understood as meaning the mean diameter, regarded as being the mean of the greatest dimension of the substantially spherical agglomerates) of less than or equal to 1 micron, preferably of less than or equal to 0.8 µm, indeed even of less than or equal to 0.5 µm. However, it should be noted that the diameter of these nodules is generally greater than or equal to 0.1 µm, indeed even greater than or equal to 0.2 µm.

The layer made of base plastic comprising nodules in accordance with the invention can be a monolayer article, such as a film, a sheet, a hollow body (container) and the like. However, advantageously, it is a layer within a multilayer structure. The term "multilayer structure" according to this alternative form of the invention is understood to mean any article having at least two layers, including one essentially composed of base plastic with nodules of barrier plastic. Preferably, this article is a hollow body intended to contain a powder, granules, and the like, and preferably a fluid. In this case, generally, the multilayer structure also comprises a layer essentially composed of a plastic which is a barrier to the migration of the fluid which it contains and/or of certain gases (air, water vapour). Good results are obtained when the base plastic layer which comprises nodules is an external layer (either the inner layer of the hollow body, in contact with the fluid, or the outer layer, in contact with the outside world), referred to hereinafter as "layer B". In a very particularly preferred way, the layer B is the inner layer of the hollow body.

The content of barrier plastic in this layer B is generally less than 5% by weight. In practice, this content is generally less than 1%, indeed even less than 0.5%.

The multilayer hollow body in accordance with this alternative form of the invention can be used in many different applications, in particular for the purpose of transporting or containing various types of fluid, in the form of a pipe or container, such as a bottle or tank. It can be used in particular in the field of motor vehicles, in particular in the form of a fuel tank or of a filler neck for a fuel tank. Excellent results have been obtained in the case of a fuel tank.

The result of the above is that, when the multilayer structure according to this alternative form of the invention is a fuel tank, it preferably comprises at least one layer essentially composed of EVOH (ethylene-vinyl alcohol copolymer) and one layer essentially composed of HDPE (high density polyethylene) comprising EVOH nodules with a diameter of less than or equal to 1 µm.

The barrier plastic used in some alternative forms of the invention often exhibits poor adhesion with regard to the conventional polymers of which the base plastic layer is generally essentially composed, which often compels that recourse be had to an adhesive plastic layer between the barrier layer and the base layer of the structure according to the invention.

The adhesive plastic according to this alternative form of the invention is chosen according to the nature of the barrier plastic and of the base plastic. Use is frequently made, as adhesive plastic, of a compatibilized polyolefin and in particular of compatibilized polyethylene. The compatibilization can be obtained in particular by a grafting, in particular using a carboxylic acid anhydride, for example maleic anhydride. The adhesive plastic is preferably essentially composed of a polyolefin grafted with maleic anhydride, in particular of polyethylene grafted with maleic anhydride.

The adhesive layer is generally thin with respect to the combined structure and in particular it does not exceed a few % of the general thickness of the structure.

In the structure according to this alternative form of the invention, the barrier layer can either be one of the two external layers (situated on either side of the structure) or can be an intermediate layer included between the two external layers. The latter alternative form is advantageous, the barrier plastic often being weaker than the base plastic. When the barrier plastic layer is sandwiched between two base plastic layers, there are generally two layers of adhesive (one on each side of the barrier layer), each having a thickness of the order of 1 to 2%, indeed even 3%, of the structure.

According to another alternative form of the invention, instead of resorting to a separate layer of adhesive plastic, the latter is simply blended with the base plastic, as disclosed in Patent Application FR 2 776 228.

Whatever the alternative from chosen (adhesive in a separate layer or blended in the base plastic), the overall content of adhesive in the structure (all layers taken into account) generally does not exceed 10%, preferably 8%, indeed even 5%, by weight of the overall structure.

From an economic viewpoint, it is advantageous for the base plastic layer or layers comprising barrier plastic in the dispersed form to comprise production scraps with similar structures (that is to say, having a barrier plastic layer and a base plastic layer comprising or not comprising dispersed barrier plastic) or fragments of waste similar structures optionally subjected to a pretreatment (in particular for the purpose of purifying them).

According to an advantageous alternative form, in addition to the abovementioned layer B, the structure according to the invention comprises at least one second base plastic layer comprising barrier plastic dispersed in the form of nodules with a diameter of less than or equal to one micron and this second layer is an intermediate layer (inserted between 2 layers) of the hollow body (layer C). Its content of barrier plastic is also less than 15% by weight, preferably less than or equal to 8% by weight and in a very particularly preferred way less than or equal to 5% by weight. However, this content will advantageously be greater than the content of barrier plastic in the inner layer and, in a particularly preferred way, greater than or equal to 1% by weight, indeed even greater than or equal to 2% by weight.

This alternative form of the invention is advantageous as it offers the possibility of using a greater amount of recycled plastic (production scraps or waste former structures). For certain applications, a good compromise (economic advantage/mechanical properties) is obtained when the content of barrier plastic in this intermediate layer is from 1 to 8% by weight. This is because, above 8% by weight of barrier plastic, the mechanical properties (and in particular the cold impact strength) of the multilayer structures become inadequate for certain applications.

There is a certain economic advantage to the fact of being able to use not only recycled plastic in an intermediate layer, in relatively high amounts, but also in the external layers in lower amounts (in order not to place an excessive strain on the aesthetic and/or mechanical properties of the structure). Consequently, according to a particularly advantageous alternative form, the present invention relates to a multilayer structure having at least two base plastic layers (one external (B) and one intermediate (C)) with dispersed barrier plastic, the content of barrier plastic in the layer B being less than 1% by weight and the content of barrier plastic in the layer C being from 1 to 8% by weight.

The layer and/or the multilayer structure according to the invention can be prepared in any known way, generally by extrusion, injection moulding, slush moulding, thermoforming, and the like. In particular, this layer can be prepared by extrusion. For the multilayer hollow bodies comprising at least one layer as described above, moulding processes are highly suitable and in particular the process referred to as extrusion-blow moulding.

Consequently, the present invention also relates to a process for the manufacture of a hollow body as described above, the said process comprising at least one stage of extrusion-blow moulding of a multilayer parison comprising at least one layer of a base plastic comprising barrier plastic dispersed in the form of nodules with a diameter of less than or equal to one micron. Preferably, this layer is an external layer of the parison and, in a very particularly preferred way, the parison also comprises a barrier plastic layer. The layers of the abovementioned parison can have any relative thickness. However, in particular for economic imperatives, the barrier plastic layer is generally limited to a few % only (typically between 1 and 5%, indeed even between 2 and 4%, by weight of the structure), the remainder of the structure being generally essentially composed of base plastic (the optional adhesives also being used in the proportion of a few % only).

In this process, the dispersing of the barrier plastic in the base plastic can be carried out during the processing by extrusion-blow moulding. However, this dispersing is sometimes difficult to carry out by varying the processing parameters alone, even using compatibilizing agents (for example of similar nature to the abovementioned adhesives) and/or appropriate mixing devices (mixer nozzles, static mixers). In contrast, the Applicant Company has found that, surprisingly, when the said layer comprises fragments of a similar multilayer structure which have been subjected beforehand to an electrostatic separation treatment, this dispersing was carried out without difficulty, this being the case even in the absence of the abovementioned compatibilizing agents and/or abovementioned mixing devices.

Consequently, an advantageous alternative form of this aspect of the invention consists of a manufacturing process as described above but incorporating a process for recycling at least a portion of a multilayer hollow body comprising at least one barrier plastic layer and one base plastic layer and comprising the following stages:

the said portion of the hollow body is fragmented;
the fragments obtained are subjected to at least one electrostatic separation stage, so as to obtain at least one stream (A) of fragments poor in barrier plastic and one stream (B) of fragments richer in barrier plastic;
a multilayer parison, comprising an external layer comprising fragments resulting from the stream (A), is manufactured by extrusion;
the said parison is blow moulded.

In the process described above, it is advantageous for the stream (A) to have a content of barrier plastic of less than 1% by weight and for the stream (B) to have a content of barrier plastic of greater than or equal to 1% by weight.

The fragments resulting from the stream (A) can be used as is, as external layer, or can be blended with optional additives, reinforcements, and the like, and/or with virgin base plastic (not yet used). The latter alternative form (diluting with virgin plastic) is preferred. In practice, a degree of dilution of greater than or equal to 20%, and even of greater than or equal to 30%, but less than or equal to 80%, indeed even less than or equal to 60%, is highly suitable [the term "degree of dilution" is understood to mean the % by weight of fragments with respect to the (fragments+virgin resin) blend].

In the above, the terms "based on" are at least equivalent to the term "made of" defined above. Preferably, they mean "composed only of".

In the process described above, it is, of course, advantageous also to be able to use the stream (B) richer in barrier plastic. In this case, advantageously, the stream (B) is used in an intermediate layer of the parison. It can be used as is or diluted with virgin plastic. Generally, it is possible to use material resulting from this stream as is, provided that its content of barrier plastic is not excessively high. In the case in particular of multilayer fuel tanks, it has been found that a content of less than or equal to 8% by weight gives good results. Consequently, according to an advantageous alternative from, in the process described above, the stream (B) has a content of barrier plastic of less than or equal to 8% by weight and the parison comprises an intermediate layer based on fragments resulting from this stream (B).

The fragmentation can be carried out in any known way, at ambient temperature or under hot conditions. It can, for example, be carried out between the crystallization temperature of the barrier plastic (Tc, in ° C.) and Tc −20° C., as disclosed in the abovementioned Patent Application FR 2 765 828. In the case of recycling of production scraps, it is advantageous to fragment them in line when they are still hot.

On conclusion of the fragmentation, fragments having their greatest dimension of greater than or equal to 1 mm, preferably of greater than or equal to 2 mm, indeed even of greater than or equal to 5 mm, are preferably present. Generally, this dimension is less than or equal to 15 mm, preferably less than or equal to 12 mm indeed even less than or equal to 8 mm.

The electrostatic separation can also be carried out in any known way, devices being available commercially for this purpose. It is preferably carried out using equipment in which the fragments are first charged and subsequently separated into streams of different composition by passing through an electrostatic field and collecting by means of an appropriate device. The latter advantageously comprises at least two separate containers (or separate compartments in the same container), so as to be able to separately collect the abovementioned streams (A) and (B). It may sometimes prove to be advantageous to collect at least three separate streams, each having a different content of barrier plastic. According to this alternative form, the stream poorest in barrier plastic corresponds to the stream (A), the stream with an average content to the stream (B) and the stream having the highest content (typically greater than or equal to 10%, indeed even greater than or equal to 20%, by weight) to a stream (C).

Taking into account the content of plastic generally used in multilayer structures (and in particular in fuel tanks), the content of barrier plastic in this stream (C) will generally be less than or equal to 50%, preferably less than or equal to 40%, indeed even less than or equal to 30%.

This stream (C) will preferably not be reused as is in a new multilayer structure, its composition generally not making it possible to obtain good mechanical properties. This stream will generally be discarded or, advantageously, taking into account the cost of barrier plastics in general, will be subjected to one or more appropriate treatments which make it possible to enrich it in barrier plastic and, doing this, to recycle it in the barrier layer of a multilayer structure (similar to or different from the original structure).

Thus, according to an alternative form of the process, during the electrostatic separation, at least one third stream (C) is generated, the content of barrier plastic of which is greater than or equal to 10%, and this stream (C) is subjected to a subsequent treatment stage which makes it possible to enrich it in barrier plastic. Such a treatment stage can consist of a selective dissolution of the barrier plastic and a reprecipitation of the latter, as disclosed in Patent Application FR 03/03209.

The process described above is particularly well suited to being incorporated in the industrial manufacture of fuel tanks as are described in detail in the first part of this application and in particular of fuel tanks based on HDPE and on EVOH.

Good results have been obtained during the manufacture of the following structures (comprising, from the inside outwards, the layers based on the following materials): P+R1/A/B/A/R2/P, where:

P=HDPE,
A=adhesive based on PE-g-MA (HDPE grafted with maleic anhydride),
B=EVOH barrier,
R1 and R2=fragments with similar structures treated by electrostatic separation corresponding respectively to the abovementioned definitions of the streams (A) and (B) and having respectively an EVOH content of less than 1% by weight and from 1 to 8% by weight.

In fact, similar tanks, of P/A/B/A/R/P type (with R=fragments with similar structures which have not been subjected to an electrostatic treatment) have been sold for about 10 years, both in North America and in Europe, to meet increasingly demanding evaporative standards. The relative thicknesses of the various layers in these tanks are typically (as % by weight of the structure): 40/2/3/2/40/13.

Such waste tanks or their production scraps advantageously act as base for the manufacture of new tanks according to the present invention. Thus, over time, some manufacturing operations (for example, during (re)start-up) will be carried out without use of production scraps, whereas others will use it to a greater or lesser extent, depending on the quality of the preceding production operations. Some production operations can also be carried out based on plastics resulting from waste tanks. In this case, these plastics will preferably have been subjected to a purification (in particular purification from residual fuel) and/or regeneration treatment (it being understood that the waste plastics, and in particular the HDPE, may have deteriorated as a result of the ageing thereof). It may in particular prove to be advantageous to blend a regenerating agent (such as a polyfunctional epoxide) with the waste base plastic (in particular when it is HDPE) before processing it by extrusion-blow moulding. Such a regeneration process is disclosed in Application WO 03/024692.

One advantage of the process according to the invention is that, by virtue of the good dispersion of the barrier plastic, the thickness of the intermediate layer of regrind can range up to 50% of the total thickness of the structure, whereas, in the fuel tanks according to the prior art, where regrind was recycled as is, without electrostatic separation, this thickness was generally limited to 40% of the total thickness of the structure, in order not to place an excessive strain on its properties. Specifically, the Applicant Company has found that; in the layers of regrind not subjected to an electrostatic separation, the barrier plastic nodules generally had a diameter of greater than or equal to 1 µm, indeed even of greater than or equal to 2 µm, in contrast to the structures of the present invention, where the nodules are less than 1 µm.

In addition, the fact of including regrind in the inner layer of the tank, this being done in a proportion of a maximum of 80% (with respect to the total weight of the layer), makes it possible to bring the maximum overall level of reuse of recycled plastics to 75% without harming the properties of the structure, this still being the case by virtue of the quality of the dispersing of the barrier plastic in the base plastic.

The present invention is illustrated without implied limitation by the following example:

EXAMPLE

Five successive generations (0, 1, 2, 3 and 4) of fuel tans of type P+R1/A/B/A/R2/P were manufactured with:
P+R1=inner layer based on virgin HDPE (grade Eltex® RSB714) for generation 0 (where R1=0) and comprising 46.2% by weight of a stream R1 (defined hereinbelow) diluted in 53.8% of virgin HDPE for the following generations, this layer constituting 42% of the total structure,
A=layers of adhesive based on PE-g-MA (Admer L2100) and each constituting 2% by weight of the structure,
B=EVOH layer (Eval F101) constituting 2.75% by weight of the structure,
R2=layer based on a stream R2 (defined hereinbelow) and constituting 40% by weight of the structure,
P=outer layer based on virgin HDPE constituting the remainder of the structure, in the following way:

1. Extrusion-Blow Moulding:
Bekum BAT1000 plant comprising 6 extruders (one per layer), the total throughput of which is 330 kg/h and the geometric characteristics of which are as follows:
1. Inner layers and regrind: 100 mm, L/D 24;
2. Outer layer: 50 mm, L/D=20;
3. Adhesive and barrier layers: 38 mm, L/D=20,
mould of NS type (9 kg, capacity 75 l) with the degating regions covered with a PTFE sheet with a thickness of 0.1 mm,
artificial increase in the degree of recycling to 60% by weight from one generation to another,
duration of the manufacturing cycles: 156 s of machine time (including 88 s in the mould) and 150 s from the outlet of the blow moulding device to the grinding (stages of degating, weighing and conveying the scraps to the grinder), 2. Fragmentation: Herbold grinder of SMS 60180 type, 8 mm screen, 3. Electrostatic separation: EKS-L triboelectric separator sold by Hamos; this device separated the fragments generated in the preceding stage into 3 streams, the analysis of which, after separation of the dust and fines, gave the following result:
a stream R1 rich in HDPE comprising 0.24% of EVOH and constituting 30% of the total stream,
a stream R2 comprising 1.17% of EVOH and constituting 60% of the total stream,
a stream R3 comprising the remainder of the EVOH (i.e. approximately 20%) and constituting 10% of the total stream,
4. New extrusion-blow moulding in accordance with stage 1 described above, where the streams R1 and R2 generated in the preceding stage are reused but not the stream R3, which was discarded,
5. New fragmentation, and the like.

Several tanks of each generation were analysed, both from the viewpoint of their bursting strength and of their cold impact strength, and no significant difference could be observed from one generation to another.

The invention claimed is:
1. A process for the manufacture of a plastic layer or a multilayer comprising the plastic layer, the plastic layer comprising:
a base plastic; and
a barrier plastic;
wherein the process comprises:
extruding a composition comprising the base plastic and the barrier plastic to obtain the layer or multilayer,
wherein
the barrier plastic is dispersed in the base plastic as nodules having a diameter of less than or equal to one micron, the barrier plastic is incompatible with the base plastic,
the base plastic is a high density polyethylene, and
the barrier plastic is a vinyl alcohol polymer.

2. The process according to claim 1, wherein in the multilayer the plastic layer comprising the nodules of the barrier plastic is an external (inner or outer) layer of the multilayer structure.

3. The process according to claim 1, wherein the multilayer structure is a hollow body for containing fluid and an inner layer of the hollow body in contact with the fluid is the layer comprising the barrier plastic.

4. The process according to claim 3, wherein the multilayer hollow body is a fuel tank and the barrier plastic is an ethylene-vinyl alcohol copolymer (EVOH).

5. The process according to claim 1, wherein the multilayer structure further comprises at least one second plastic layer comprising the base plastic and the barrier plastic, wherein the barrier plastic is dispersed, in the base plastic as nodules with a diameter of less than or equal to one micron.

6. The process according to claim 4, wherein an intermediate layer of the multilayer fuel tank is a plastic layer comprising the base plastic and the barrier plastic is dispersed in the base plastic as nodules with a diameter of less than or equal to one micron.

7. The process according to claim 3, wherein a content of barrier plastic in the inner layer is less than 1% by weight of the inner layer.

8. The process according to claim 6, wherein a content of the barrier plastic in the intermediate layer is from 1 to 8% by weight of the intermediate layer.

* * * * *